(12) United States Patent
Suzuki et al.

(10) Patent No.: US 6,340,489 B1
(45) Date of Patent: Jan. 22, 2002

(54) MANUFACTURING PROCESS OF CARROT JUICE

(75) Inventors: Yuko Suzuki; Akio Sugimoto; Takami Kakuda; Yasuhiko Ikegawa, all of Shizuoka (JP)

(73) Assignee: Ito En, Ltd., Tokyo (JP)

( * ) Notice: Subject to any disclaimer, the term of this patent is extended or adjusted under 35 U.S.C. 154(b) by 0 days.

(21) Appl. No.: 09/449,530

(22) Filed: Nov. 29, 1999

(51) Int. Cl.$^7$ ............... A23L 2/02; A23L 2/42
(52) U.S. Cl. ............ 426/489; 426/492; 426/506; 426/509; 426/510; 426/599; 426/330.5
(58) Field of Search ............... 426/489, 492, 426/506, 509, 599, 510, 330.5, 615

(56) References Cited

U.S. PATENT DOCUMENTS

| | | | | |
|---|---|---|---|---|
| 2,724,652 A | * | 11/1955 | Brent et al. ............ | 426/387 |
| 2,780,551 A | * | 2/1957 | Guadagni ............. | 426/268 |
| 3,917,867 A | * | 11/1975 | Atkins et al. ............ | 426/492 |
| 4,808,420 A | * | 2/1989 | Springler et al. ......... | 426/106 |
| 4,848,678 A | * | 7/1989 | Iwasaki et al. ............ | 241/65 |
| 5,126,153 A | * | 6/1992 | Beck .................. | 426/269 |
| 5,393,547 A | * | 2/1995 | Balaban et al. ......... | 426/330 |
| 5,403,613 A | * | 4/1995 | Furui et al. ............ | 426/599 |
| 5,645,879 A | * | 7/1997 | Bourne .............. | 426/321 |

FOREIGN PATENT DOCUMENTS

| GB | 1232410 | * | 5/1971 | |
|---|---|---|---|---|
| JP | 06217744 | | 8/1994 | |

OTHER PUBLICATIONS

Encyclopedia Britannica Online, © 1994–2000.*

* cited by examiner

Primary Examiner—Milton I. Cano
Assistant Examiner—Robert A. Madsen
(74) Attorney, Agent, or Firm—Sughrue Mion, PLLC

(57) ABSTRACT

It is an object of the present invention to provide a manufacturing process of carrot juice capable of obtaining, with high yield, carrot juice having a high-quality and stable characteristic free from occurrence of cohesion with less fishiness. To this end, the present invention comprises, first, peeling washed raw carrot, carrying out enzyme deactivation processing within one day, preferably, within 12 hours after peeling, and second, completely deactivating pectin esterase activity of carrot and carrying out enzyme deactivation processing so that a residual rate of pectinase activity is less than 60%. Such an enzyme deactivation processing may be done by blanching carrot till an internal temperature reaches 70 to 80° C. in water at 70 to 80° C., or blanching carrot till an internal temperature reaches 60 to 70° C. in 0.02M to 0.05M citric acid solution at 60 to 70° C., or processing carrot with supercritical carbonic acid gas by a microbubble SC—$CO_2$ method. The carrot subjected to the enzyme deactivation processing was crushed similarly to normal vegetable juice or fruit juice and squeezed, and the obtained squeezed juice is adjusted to an acid region or to about pH 4.2, for example, such as citric acid solution, after which it is sterilized and filled into a container to serve as the carrot juice.

7 Claims, 2 Drawing Sheets

MANUFACTURING PROCESS OF CARROT JUICE

BACKGROUND OF THE INVENTION

1. Field of the Invention

The present invention relates to a process of manufacturing carrot juice having a high-quality and stable characteristic free from occurrence of cohesion.

2. Related art statement

Generally, a conventional manufacturing process of carrot juice comprises: heating (blanching) carrot in boiling water to deactivate enzyme, and thereafter crushing and grinding it to squeeze juice. However, this process has a problem that the rate of squeeze is low, a color tone of squeezed juice is bad, blanching requires a long period of time to give the squeezed juice heated smell, and its taste is also bad. Japanese Patent Application Laid-Open No. HEI 6-217744 discloses a manufacturing process comprising: first, adding vitamin C and/or citric acid component while crushing or cutting carrot, heating (blanching) the resultant crushed material to a product temperature of 80 to 90° C. to deactivate enzyme, then squeezing juice by a biaxial rotary type extruder to obtain the juice.

OBJECT AND SUMMARY OF THE INVENTION

When blanching is carried out after the carrot has been crushed, as in the invention disclosed in the above-described Japanese Patent Application Laid-Open No. HEI 6-217744, the heated smell is removed, but fishiness is so severe that the juice is hard to take.

From the foregoing, if the above-described invention is merely changed to carry out crushing after blanching, where blanching takes place so that a product temperature reaches 80 to 90° C., there poses a problem that the heated smell is given to the squeezed juice, and when the product temperature is lowered in order to avoid the heated smell, cohesion occurs, lowering the quality on the contrary.

Further, it has been found that when blanching is carried out in boiling water to allow the product temperature reach 80 to 90° C., the rate of squeeze lowers, and the taste also deteriorates.

In view of the foregoing, it is an object of the present invention to elucidate the cause of cohesion in the manufacturing of carrot juice, and to provide, in a manufacturing process comprising crushing after blanching carrot, a manufacturing process of carrot juice capable of obtaining, with high yield, carrot juice being less fishy and free from occurrence of cohesion, and having a high-quality and stable characteristic.

A manufacturing process of carrot juice according to the present invention is characterized by comprising: peeling raw carrot, completely deactivating pectin esterase activity of carrot without passage of one day or more in the peeled state, carrying out enzyme deactivation processing so that the residual rate of pectinase activity is less than 60%, and thereafter crushing and squeezing it.

That is to say, in the present invention, it is necessary to carry out enzyme deactivation processing without passage of one day or more, preferably, 12 hours or more after peeling of the peeled raw carrot. The reason why is that when one day or more passes in the peeled state, it is difficult to prevent an occurrence of cohesion even if sufficient blanching takes place till the product temperature reaches, for example, 90° C.

The enzyme deactivation processing according to the present invention is to completely deactivate pectin esterase activity of carrot and to make the residual rate of pectinase activity less than 60%. There is the possibility to generate cohesion if the pectin esterase activity is not completely deactivated or the residual rate of pectinase activity is 60% or more.

As a first example of such an enzyme deactivation processing as described, there can be mentioned a process of blanching carrot till an internal temperature reaches 70 to 80° C. in water at 70 to 80° C. By this process, the pectin esterase activity of carrot can be completely deactivated, and the residual rate of pectinase activity can be made less than 60%. In such as process as described, when a water temperature for blanching is lower than 70° C., cohesion occurs due to the function of pectin cracked enzyme, and at a temperature higher than 80° C., the yield reduces, and the heated smell results.

As a second example, there can be mentioned a process of blanching carrot till an internal temperature reaches 60 to 70° C. in a 0.02M to 0.05M citric acid solution at 60 to 70° C. Even by this process, not only the pectin esterase activity can be completely deactivated, and the residual rate of pectinase activity can be made less than 60% but also a water temperature for blanching can be further lowered, whereby it is possible to further positively prevent adhesion of the heated smell, and in addition, the yield can be further enhanced.

As a third example, there can be mentioned a processing of carrot by super-critical carbonic acid gas, for example, a processing by a microbubble $SC-CO_2$ process. Even by this process, not only the pectin esterase activity can be completely deactivated, and the residual rate of pectinase activity can be made less than 60% but also a water temperature for blanching can be further lowered.

As a fourth example, there can be mentioned a process comprising a combination of the above-described first or second blanching process and the above-described third super-critical carbonic acid gas processing process. According to such a combined process as described, the pectin esterase activity can be completely deactivated, and the residual rate of pectinase activity can be made less than 60% and it is possible to prevent adhesion of the heated smell.

DESCRIPTION OF THE PREFERRED EMBODIMENT

Figure 1:
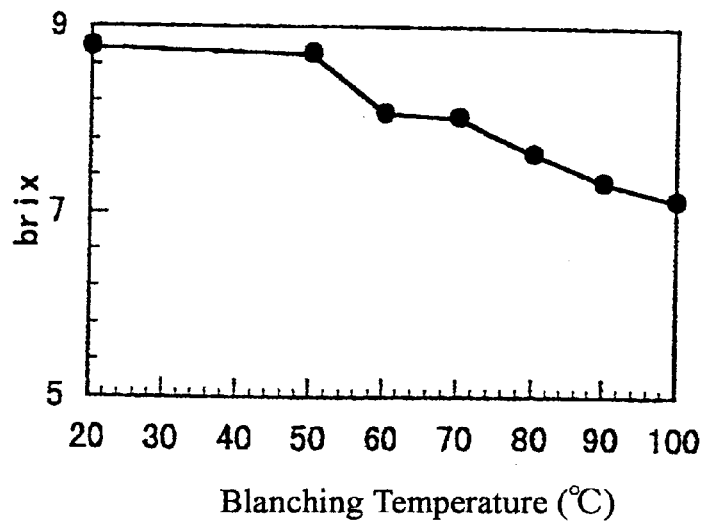
FIG. 1 is a graph showing a relationship between a blanching temperature and a juice brix.

In the manufacturing process of carrot juice according to the present invention, washed raw carrot is peeled, and the following enzyme deactivation processing is carried out within one day after peeling, preferably, within 12 hours. When one day or more passes in the peeled state, it is difficult to prevent generation of cohesion even by carrying out the following enzyme deactivation processing.

Next, the raw carrot in the peeled state is subjected to enzyme deactivation processing.

As process of enzyme deactivation processing, processing is accomplished so that carrot is subjected to blanching till an internal temperature reaches 70 to 80° C. in water at 70 to 80° C., or carrot is subjected to blanching till an internal temperature reaches 60 to 70° C. in a 0.02M to 0.05M citric acid solution at 60 to 70° C., or carrot is processed by, for example, a microbubble SC—$CO_2$ process using a supercritical carbonic acid gas whereby the pectin esterase activity is completely deactivated, and the residual rate of pectinase activity is made less than 60%.

Preferably, carrot is subjected to blanching till an internal temperature reaches 70 to 80° C. in water at 70 to 80° C., or carrot is subjected to blanching till an internal temperature reaches 60 to 70° C. in a 0.02M to 0.05M citric acid solution at 60 to 70° C., after which carrot is processed by a supercritical carbonic acid gas processing process. In doing so, the pectin esterase activity of carrot can be completely deactivated, the residual rate of pectinase activity can be made less than 60%, and the adhesion of the heated smell can be prevented.

Next, the carrot subjected to the enzyme deactivation processing as described above is crushed and squeezed similarly to normal vegetable juice and fruit juice.

The obtained squeezed liquid is prepared in an acid region, preferably, about pH 4.2, for example, by a citric acid solution, after which it is sterilized and filled into a container to serve as a carrot juice drink.

In the following, the cause of cohesion in carrot juice and the effect of the present invention will be explained through various tests.

(Enzyme Addition Test 1)

Various enzymes were added to the carrot juice to observe the generation of cohesion.

Carrot concentrated juice manufactured by the conventional known process (prepared by blanching up to a product temperature of 80 to 90° C. in boiling water, crushing and squeezing) is diluted by distilled water to brix 6.0 to use as a sample. Cellurase, hemicellurase, α-amirase, β-amirase, pectinase, pectin esterase, peroxidase, catalase, and ascorbic acid oxidase were prepared in several stages in a range of 1 unit/ml to 10 unit/ml (0.08 μg/ml to 3.3 mg/ml) and added to the sample, and reacted for 30 minutes at a proper temperature of the enzymes, after which the enzymes were completely deactivated by the heating for 5 minutes at 100° C. There was adjusted to pH 4.2 by 5% citric acid, and heating was carried out for 2 minutes at 80° C., after which the cohesion was observed with the naked eye.

As a result, the cohesion was recognized in the sample having pectinase added and the sample having pectin esterase added.

(Enzyme Addition Test 2)

After a commercially available carrot has been washed with water, the carrot is peeled and cut into a 2 cm square dice, which is subjected to blanching till an internal temperature reaches 100° C. to crush it, the carrot being squeezed by filtration and being subjected to centrifugal separation (3000 rpm, 10 minutes) to provide the carrot juice, which was assured of that the pectinase activity was completely deactivated to use as a sample. Various enzyme (pectinase, pectin esterase) solutions were added to the sample and reacted for 30 minutes at 25° C., after which the enzymes were deactivated by the heating for 5 minutes at 100° C. There was adjusted to pH 4.2 by 5% citric acid, and heating was carried out for 2 minutes at 80° C., after which the cohesion was observed with the naked eye.

As a result, in the carrot juice in which the pectinase activity was completely deactivated, cohesion was recognized only in the case where pectinase was added.

As described above, in the carrot juice in which the pectinase activity remains, cohesion is recognized relative to the addition of pectinase and the addition of pectin esterase, and in the carrot juice in which the pectinase activity is deactivated, cohesion is recognized only relative to the addition of pectinase. It was therefore understood that the pectinase activity is indispensable to the cohesion of the carrot juice, and that the pectin esterase is also concerned in.

(Blanching Temperature Test)

After a commercially available carrot has been washed with water, the carrot is peeled and cut into a 2 cm square dice, which is subjected to blanching till an internal temperature reaches 50 to 100° C. in water set to a temperature of 50 to 100° C. (for example, subjected to blanching till an internal temperature reaches 70° C. in water at a temperature of 70° C., the temperature at that time being 70° C., the same is true hereinafter), after which the carrot was crushed, and squeezed by filtration and being subjected to centrifugal separation (3000 rpm, 10 minutes) to provide the carrot juice. As a comparative example, juice was prepared which is not subjected to blanching (unprocessed area).

Figure 2:
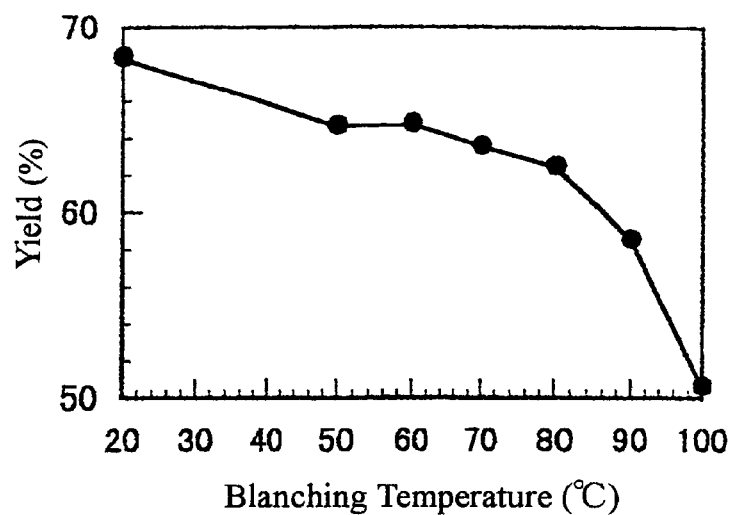
FIG. 2 is a graph showing a relationship between a blanching temperature and a juice yield.
Figure 3:
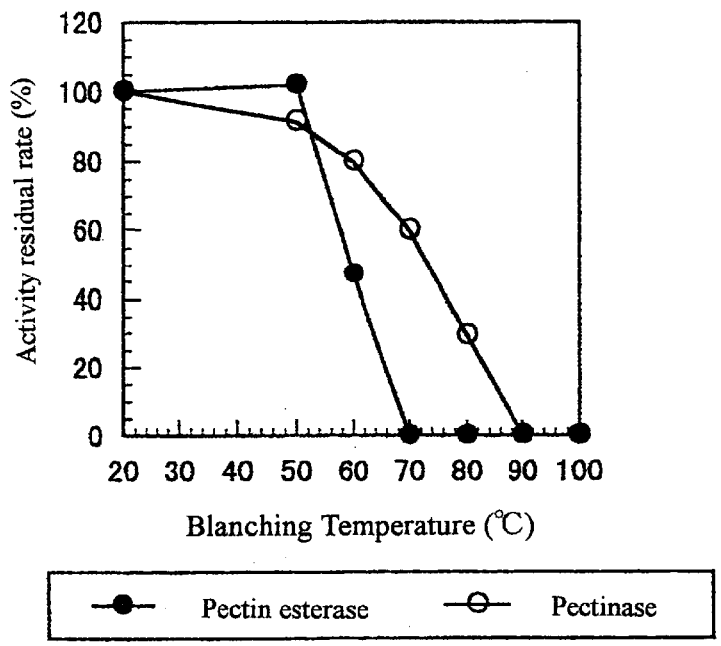
FIG. 3 is a graph showing a relationship between a blanching temperature and a residual rate of enzyme activity.

Table 1 shows, in connection with the juices obtained by the blanching temperature test, the blanching temperature, cohesion evaluation, residual rate of pectinase activity (%), residual rate of pectin esterase activity (%), squeezed rate (weight %), Brix, titration acid (W/W %), pg, and color tone. FIGS. 1, 2, and 3 are graphs showing a relationship between the blanching temperature, brix, yield and enzyme activity.

In the above-described cohesion evaluation, evaluation was made by preparing the juices to pH 4.2 by 5% citric acid, heating it for 2 minutes at 80° C., observing the cohesion with the naked eye, and putting a mark + when cohesion was recognized.

The squeezing rate (weight %) was calculated in the following formula.

(Quantity of obtained squeezed liquid/quantity of carrot after peeled)×100

The residual rate of pectinase activity is given by mixing 0.1 ml (milli-liter) of 0.4 M sodium phosphate—citric acid buffer solution pH 4.0, 0.1 ml of 1% polygalacron acid solution, and 0.3 ml of carrot juice subjected to dialysis processing, reacting the resultant mixture for 30 minutes in a water bath at 65° C., estimating the produced galacron acid by Somogyi Nelson method, and making the activity the g mol number of galacron acid produced for one minute by 1 ml of juice, which was shown at the ratio relative to the activity of juice not subjected to heating process.

With respect to the residual rate of pectin esterase activity, 10 mil of carrot juice was added to 100 mil of 1% citrus pectin containing 0.15M sodium chloride, and pH was adjusted to 7.0 with sodium hydroxide solution, after which titration was done with N/20 sodium hydroxide solution so as to maintain pH 7.0 while stirring them for 10 minutes at 30° C., and the quantity of the produced carboxyl group was estimated. Several μmol of carboxyl group produced for one minute by 1 ml of juice was made the activity, which was shown at the ratio relative to the activity of juice not subjected to heating process.

The color tone was measured by a colorimeter (Made by Nippon Denshoku Kogyo Ltd.; Z-1001 DP).

TABLE 1

| Blanching Temperature | — | 50 | 60 | 70 | 80 | 90 | 100 |
|---|---|---|---|---|---|---|---|
| Cohesion | + | + | + | − | − | − | − |
| Pectinase activity residual rate (%) | 100 | 91.2 | 79.6 | 59.7 | 29.1 | 0 | 0 |
| Pectin esterase activity residual rate (%) | 100 | 102 | 47.0 | 0 | 0 | 0 | 0 |
| Squeeze rate (%) | 68 | 65 | 65 | 64 | 62 | 59 | 51 |
| Brix | 8.76 | 8.70 | 8.06 | 8.02 | 7.63 | 7.73 | 7.13 |
| Titration acid portion (W/W %) | 0.06 | 0.05 | 0.05 | 0.05 | 0.05 | 0.05 | 0.04 |
| pH | 6.60 | 6.59 | 6.57 | 6.33 | 6.25 | 6.35 | 6.43 |
| Color tone | | | | | | | |
| L | 39 | 40 | 40 | 41 | 42 | 42 | 42 |
| a | 27 | 26 | 26 | 27 | 29 | 29 | 28 |
| b | 23 | 23 | 23 | 23 | 24 | 25 | 24 |

From the result of Table 1, the cohesion was prevented by the blanching at 70° C. or higher. Further, from the result of FIG. 3, in the blanching at 70° C. by which cohesion was prevented, the pectinase activity was lowered to 60% or less, and the pectin esterase activity was completely deactivated. Further, at 80° C., the pectinase activity was lowered to 30% or less, and the pectin esterase activity was completely deactivated.

It is contemplated from this that in order to prevent the cohesion, it is necessary that the pectinase activity be lowered to 60% or less, and the pectin esterase activity be completely deactivated.

Further, from the results of FIGS. 1 and 2, it can be judged that since the yield and brix lower as a blanching temperature rises, the blanching temperature is preferably 70 to 80° C.

(Relationship Between Preservation State of Carrot and Cohesion)

Peeled carrot (made in U.S.A.) having passed one day or more in the peeled state was subjected to blanching till an internal temperature reaches a set temperature (50 to 100° C.) in water at 50 to 100° C., after which it was crushed and squeezed by filtration, and being subjected centrifugal separation (3000 rpm, 10 minutes) to provide the carrot juice.

On the other hand, the same kind of carrot (made in U.S.A.) as that mentioned above was peeled and cut, immediately after which the processing similar to that mentioned above was carried out to obtain the carrot juice.

The carrot juice was adjusted in pH to 4.2 with 5% citric acid, and heated for 2 minutes at 80° C. The cohesion was then observed with the naked eye to give the result as shown in Table 2 below.

TABLE 2

| | Test Area | | | | | |
|---|---|---|---|---|---|---|
| | A | | | B | | |
| Test number | Test number | Cohesion number | Cohesion rate (%) | Test number | Cohesion number | Cohesion rate (%) |
| Unprocessed | 2 | 2 | 100 | 2 | 2 | 100 |
| 50° C. | 2 | 2 | 100 | 2 | 2 | 100 |
| 60° C. | 2 | 2 | 100 | 2 | 2 | 100 |
| 70° C. | 4 | 3 | 75 | 2 | 0 | 0 |
| 80° C. | 4 | 2 | 50 | 2 | 0 | 0 |
| 90° C. | 3 | 1 | 33 | 2 | 0 | 0 |
| 100° C. | 2 | 0 | 0 | 2 | 0 | 0 |

A: Carrot having passed one day or more in the peeled state
B: Carrot immediately after peeling As a result, in the carrot juice subjected to blanching processing immediately after peeling, no cohesion was recognized if blanching at 70° C. or higher takes place, but in the carrot juice preserved for a long period of time in the peeled state, cohesion was recognized even at 70 to 90° C.

It has been found therefrom that the preservation period in the peeled state influences on the prevention of generation of the cohesion.

(Functional Test)

As an embodiment, commercially available carrot (made in Australia, Western red) was washed with water and peeled, after which it was cut into 2 cm square dice, which was subjected to blanching till an internal temperature reaches 70 to 80° C. in water at 70 to 80° C.

On the other hand, as a comparative example, blanching was carried out till an internal temperature reaches 90° C. in boiling water.

Thereafter, in both the embodiment and the comparative example, the carrot is crushed and squeezed by filtration, and being subjected to centrifugal separation (3000 rpm, 10 minutes) to provide the carrot juice. The functional evaluation was carried out.

The functional evaluation was done by panelers of 10 males and 10 females to see if either the embodiment or the comparative example is preferable. Further, Brix, pH, titration acid (acidness), and presence of cohesion were measured in accordance with the above-described measuring method, results of which are given in Table 3 below.

TABLE 3

| | Embodiment | Comparative example |
|---|---|---|
| pH | 5.77 | 6.00 |
| Brix | 7.1 | 6.1 |
| Acidness | 0.04 | 0.04 |
| Cohesion | — | — |
| Functional test | | |
| Sweetness | 3.72 | 3.00 |
| Overall | 3.00 | 3.00 |

As a result, in the embodiment, as compared with the comparative example, the sweetness was strongly felt significantly at the danger rate 5%.

Blanching Test with Citric Acid Solution)

Commercially available carrot was washed with water and peeled, after which it was cut into 2 cm square dice, which was subjected to blanching till an internal temperature reaches 60° C. in 0.01 to 0.5 citric acid solution at 60° C. or in water at 60° C. Thereafter, the carrot is crushed and squeezed by filtration, and being subjected to centrifugal separation (3000 rpm, 10 minutes) to provide the carrot juice.

Figure 4:
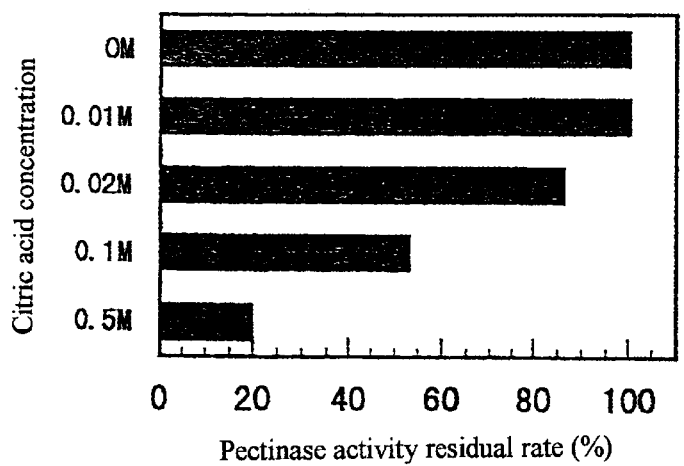
FIG. 4 is a graph showing a relationship between a concentration of citric acid solution and a residual rate of pectinase activity.

With respect to the obtained juice, the cohesion evaluation, squeeze rate (weight %), Brix, titration acid (acidness), pH, color tones were measured and observed, in accordance with the method similar to that described above, result of which is given in Table 4, and FIG. 4 shows a relationship between citric acid concentration and pectinase activity.

TABLE 4

| Citric acid concentration | 0.5 M | 0.1 M | 0.05 M | 0.02 M | 0.01 | 0 M |
|---|---|---|---|---|---|---|
| Cohesion | − | − | − | − | + | + |
| Squeeze rate (%) | 61 | 65 | 67 | 67 | 65 | 67 |
| pH | 3.1 | 4.1 | 4.6 | 5.0 | 5.5 | 6.2 |
| Acidness (W/W %) | 1.35 | 0.35 | 0.26 | 0.13 | 0.10 | 0.07 |
| Brix | 8.6 | 7.3 | 7.5 | 7.4 | 7.0 | 7.1 |
| Color tone | | | | | | |
| L | 42 | 40 | 39 | 38 | 37 | 38 |
| a | 23 | 27 | 28 | 24 | 22 | 25 |
| b | 23 | 23 | 23 | 22 | 20 | 22 |

From the result of Table 4, if the concentration of citric acid solution is 0.02M or more, no cohesion was recognized even blanching at 60° C.

Further, from the result of Table 4, in the 0.01M citric acid solution in which cohesion occurs, the pectinase activity was similar to the case of water, but in the 0.02M citric acid solution in which cohesion could be prevented, the pectinase activity was lowered to 85% or so, and in the citric acid solution above 0.02M, the pectinase activity was suppressed depending on the concentration.

It is to be noted that in the citric acid solution above 0.1M, pH of juice is so low that is not suitable for use.

What is claimed is:

1. A manufacturing process of carrot juice for elimination of cohesion, comprising the steps of:

peeling raw carrot, blanching the carrot until an internal temperature reaches 70 to 80° C. in water at 70 to 80° C. within one day after peeling whereby pectin esterase activity of the carrot is completely deactivated, and thereafter crushing and squeezing said blanched carrot, the process further comprising carrying out additional enzyme deactivation processing so that a residual rate of pectinase activity is less than 60% and greater than 29%.

2. The manufacturing process of carrot juice according to claim 1, comprising: carrying out enzyme deactivation processing within 12 hours after peeling.

3. The manufacturing process as set forth in claim 1, further comprising applying citric acid to said blanched carrots.

4. The manufacturing process as set forth in claim 1, further comprising applying carbonic acid to said blanched carrots.

5. The manufacturing process as set forth in claim 1, further comprising applying citric acid to said blanched carrots and processing said carrots with supercritical carbonic acid gas.

6. The manufacturing process as set forth in claim 3 wherein said citric acid is a 0.02M to 0.05M citric acid solution.

7. The manufacturing process as set forth in claim 5 wherein said citric acid is a 0.02M to 0.05M citric acid solution.

* * * * *